(12) United States Patent
Xiao et al.

(10) Patent No.: US 9,060,363 B2
(45) Date of Patent: Jun. 16, 2015

(54) METHOD, SYSTEM AND DEVICE FOR ADAPTIVE MODULATION AND CODING

(71) Applicant: CHINA ACADEMY OF TELECOMMUNICATIONS TECHNOLOGY, Beijing (CN)

(72) Inventors: Guojun Xiao, Beijing (CN); Shiqiang Suo, Beijing (CN); Yu Ding, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 266 days.

(21) Appl. No.: 13/874,070

(22) Filed: Apr. 30, 2013

(65) Prior Publication Data

US 2013/0308563 A1 Nov. 21, 2013

Related U.S. Application Data

(62) Division of application No. 13/056,890, filed as application No. PCT/CN2009/073008 on Jul. 30, 2009, now Pat. No. 8,441,999.

(30) Foreign Application Priority Data

Jul. 30, 2008 (CN) .......................... 2008 1 0117462
Apr. 30, 2009 (CN) .......................... 2009 1 0083116

(51) Int. Cl.
*H04W 72/04* (2009.01)
*H04L 1/00* (2006.01)
*H04L 5/00* (2006.01)

(52) U.S. Cl.
CPC .......... *H04W 72/042* (2013.01); *H04L 1/0003* (2013.01); *H04L 1/0007* (2013.01); *H04L 1/0013* (2013.01); *H04L 1/0025* (2013.01); *H04L 5/0007* (2013.01); *H04L 5/003* (2013.01)

(58) Field of Classification Search
None
See application file for complete search history.

(56) References Cited

U.S. PATENT DOCUMENTS 8,284,732 B2 * 10/2012 Nimbalker et al. ........... 370/330
2006/0268983 A1 * 11/2006 Kwon et al. .............. 375/240.11
2009/0257382 A1 * 10/2009 Qi et al. ........................ 370/329

* cited by examiner

*Primary Examiner* — Ian N Moore
*Assistant Examiner* — Lakeram Jangbahadur
(74) *Attorney, Agent, or Firm* — Hoffmann & Baron, LLP

(57) ABSTRACT

An adaptive modulation and coding method includes selecting punctured Physical Resource Blocks (PRBs) to transmit downlink data for User Equipment (UE); determining Transport Block Size (TBS) and number of punctured PRB pairs for transmission to the UE based on the carried service; scheduling downlink data for the UE based on determined TBS, and transmitting the number of used punctured PRB pairs and a Modulation and Coding Scheme (MCS) sequence number to the UE; and the UE converting number of the punctured PRB pairs to number of normal PRB pairs, determining modulation scheme and TBS sequence number based on the MCS sequence number, and determining TBS of the downlink data based on number of normal PRB pairs and TBS sequence number.

22 Claims, 9 Drawing Sheets

METHOD, SYSTEM AND DEVICE FOR ADAPTIVE MODULATION AND CODING

CROSS-REFERENCE TO RELATED APPLICATIONS

This application is a Divisional Application of U.S. application Ser. No. 13/056,890, filed Sep. 26, 2011, which is a National Stage application of International Application No. PCT/CN2009/073008, filed Jul. 30, 2009, which claims benefit to Chinese Application No. 200810117462.6, filed Jul. 30, 2008, and Chinese Application No. 200910083116.5, filed Apr. 30, 2009, which are incorporated by reference herein in their entirety.

FIELD

The invention relates to the domain of mobile communication technology, in particular to a method, a system and a device for an adaptive modulation and coding.

BACKGROUND

The Third Generation Wireless Communication (3G) system utilizes CDMA (Code-Division Multiple Access) mode, supports multimedia services, and will have higher competitive ability for the coming several years. However, the 3GPP (Third Generation Partnership Project) started the research project of LTE (Long Term Evolution) for 3G wireless interface technology in order to keep this competitive ability for a longer time in the future. And AMC (Adaptive Modulation and Coding) technology has become one of key technologies of LTE.

AMC (Adaptive Modulation and Coding) technology is a physical layer link adaptation technology which can compensate the influence of fading on the signal reception due to channel variation by means of adaptively adjusting the modulation and coding mode of transmitting data, so as to improve the signal-to-noise ratio performance of the signal. AMC is realized as follows: the system establishes a Modulation and Coding Scheme (MCS) of transmission according to the physical layer ability and the channel quality, the MCS including parameters, such as the coding rate and modulation scheme for transmitting data, in which the system will choose different transmission modulation scheme and/or channel coding rate corresponding to the channel conditions to match the variable channel condition. In order to better understand the present invention, some basic technologies used in the present invention will be briefly introduced.

Currently, it is ensured that the LTE system supports two frame structures, namely a first type frame structure suitable for FDD (Frequency Division Duplex) system, and a second type frame structure suitable for TDD (Time Division Duplex) system. For better understanding of the present invention, the first and second type frame structure will be simply illustrated hereafter.

As shown in FIG. 1, it is a schematic view of the first type frame structure of FDD system in the prior art. The first type wireless frame has a length of 10 ms and consists of 20 time slots, each slot having a length of 0.5 ms, being denoted from 0 to 19. Two continuous time slots are defined as one subframe, and the subframe i consists of time slot $2i$ and $2i+1$, wherein i=0, 1, . . . , 9.

As shown in FIG. 2, it is a schematic view of the second type frame structure of TDD system in the prior art. The second type wireless frame also has a length of 10 ms and is firstly split into two half-frames of 5 ms. Each half-frame is divided into five subframes of 1 ms. According to the specific configuration of time slot proportion, subframe 1 and subframe 6 may be configured as special service subframe and consists of three special time slots (downlink pilot DwPTS, guard interval GP and uplink pilot UpPTS). DwPTS, as well as a general downlink subframe, can be used to carry downlink service data.

In LTE (long term evolution) system, MCS is designed based on PRB (Physical Resource Block) structure of general subframe, and then AMC process is realized by means of checking TBS (transport Block Size) table. Wherein, PRB is a basic unit for resource scheduling of LTE. As shown in FIG. 3, it schematically illustrates PRB and RE in uplink time slot in the prior art, to which PRB and RE in downlink time slot is similar. Wherein, the minimum resource granularity determined by a time domain OFDM (Orthogonal Frequency Division Multiplexing) symbol and frequency domain sub-carrier is called RE (resource element). Currently, the normal PRB of a general subframe is defined as a time-frequency resource granularity with time domain of 0.5 ms and frequency domain of 180 kHz in the protocol, i.e., the time domain corresponds to 7 OFDM symbols (for normal CP) or 6 OFDM symbols (for extended CP) and the frequency domain corresponds to one time-frequency resource granularity of 12 sub-carriers.

However, in LTE system, there may be some punctured PRB resources in some special service subframe, such as DwPTS in the special service subframe of TDD system (as shown in FIG. 2), or punctured PRB owing to synchronization channel, broadcast channel etc. The punctured PRB in these special service subframes can be used to carry downlink data as a normal PRB in general subframe. However, as the existing TBS table is designed based on a normal PRB, most of which can not be directly applied to the punctured PRB.

The disadvantage of the prior art is in that: most of options are not adapted to the punctured PRB as the TBS table defined by the existing protocol is designed based on the normal PRB. If no amendment is made, then it will result in that it is impossible for the punctured PRB to choose the optimum transmission format according to channel quality, and the efficiency of spectrum transmission will be lowered.

For further understanding of the above defects in the prior art, AMC in the prior art will be briefly described as an example. However, it should be known that the hereinafter mentioned punctured PRB is only one instance in the prior art instead of representing all instances of punctured PRB in the prior art. Firstly, MCS design is implemented based on PRB structure of general subframe. For the LTE system, service channel now supports three modulation schemes of QPSK, 16QAM and 64QAM. These three modulation schemes cooperate with specific coding rate to obtain 29 MCSs, and 3 MCSs are reserved to impliedly map TBS and modulation scheme during re-transmission, thereby there are 32 options of MCS altogether, which can be indicated by 5 bits. The system selects the optimum modulation scheme and channel coding rate to transmit data according to the measurement and prediction of channel, so as to realize the maximum system throughput while ensuring a certain transmission quality. The detailed indication for MCS can be conducted with reference to the following table 1 and 2.

TABLE 1 list of the modulation scheme and TBS sequence number corresponding to the MCS sequence number

| MCS sequence number $I_{MCS}$ | modulation scheme $Q_m$ | TBS sequence number $I_{TBS}$ |
|---|---|---|
| 0 | 2 | 0 |
| 1 | 2 | 1 |

TABLE 1-continued list of the modulation scheme and TBS sequence number corresponding to the MCS sequence number

| MCS sequence number $I_{MCS}$ | modulation scheme $Q_m$ | TBS sequence number $I_{TBS}$ |
|---|---|---|
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

Wherein, MCS indication information of 5 bits in the scheduling signalling indicates the sequence number $I_{MCS}$. According to Table 1, it can be obtained the specific modulation scheme as $Q_m$ and the sequence number of TBS as $I_{TBS}$. However, the specific TBS needs to be determined by $I_{TBS}$ in combination with the number of occupied PRB $N_{PRB}$. The number of PRB $N_{PRB}$ can be obtained based on resource indication information of the scheduling signalling, in which the scheduling takes PRB-pair as basic granularity. After $I_{TBS}$ has been obtained according to table 1, it is also necessary to look up table 2 according to $I_{TBS}$ and the number of PRB $N_{PRB}$ to obtain the final TBS. The size of table 2 is 27×110, but only the portion of $N_{PRB}$ from 1 to 9 is illustrated for the sake of clarity.

TABLE 2

TBS table

| $I_{TBS}$ | $N_{PRB}$ | | | | | | | | |
|---|---|---|---|---|---|---|---|---|---|
|  | 1 | 2 | 3 | 4 | 5 | 6 | 7 | 8 | 9 |
| 0 | 16 | 32 | 56 | 88 | 120 | 152 | 176 | 200 | 232 ... |
| 1 | 24 | 48 | 88 | 120 | 160 | 200 | 232 | 272 | 304 |
| 2 | 32 | 72 | 120 | 160 | 200 | 248 | 296 | 336 | 376 |
| 3 | 40 | 104 | 152 | 208 | 272 | 320 | 392 | 440 | 504 |
| 4 | 48 | 120 | 200 | 264 | 320 | 408 | 488 | 552 | 632 |
| 5 | 72 | 152 | 232 | 320 | 424 | 504 | 600 | 680 | 776 |
| 6 | 320 | 176 | 288 | 392 | 504 | 600 | 712 | 808 | 936 |
| 7 | 104 | 232 | 320 | 472 | 584 | 712 | 840 | 968 | 1096 |
| 8 | 120 | 248 | 392 | 536 | 680 | 808 | 968 | 1096 | 1256 |
| 9 | 136 | 296 | 456 | 616 | 776 | 936 | 1096 | 1256 | 1416 |
| 10 | 152 | 320 | 504 | 680 | 872 | 1032 | 1224 | 1384 | 1544 |
| 11 | 176 | 376 | 584 | 776 | 1000 | 1192 | 1384 | 1608 | 1800 |
| 12 | 208 | 440 | 680 | 904 | 1128 | 1352 | 1608 | 1800 | 2024 |
| 13 | 232 | 488 | 744 | 1000 | 1256 | 1544 | 1800 | 2024 | 2280 |
| 14 | 264 | 552 | 840 | 1128 | 1416 | 1736 | 1992 | 2280 | 2600 |

TABLE 2-continued

TBS table

| $I_{TBS}$ | $N_{PRB}$ | | | | | | | | |
|---|---|---|---|---|---|---|---|---|---|
|  | 1 | 2 | 3 | 4 | 5 | 6 | 7 | 8 | 9 |
| 15 | 280 | 600 | 904 | 1224 | 1544 | 1800 | 2152 | 2472 | 2728 |
| 16 | 320 | 632 | 968 | 1288 | 1608 | 1928 | 2280 | 2600 | 2984 |
| 17 | 336 | 696 | 1064 | 1416 | 1800 | 2152 | 2536 | 2856 | 3240 |
| 18 | 376 | 776 | 1160 | 1544 | 1992 | 2344 | 2792 | 3112 | 3624 |
| 19 | 408 | 840 | 1288 | 1736 | 2152 | 2600 | 2984 | 3496 | 3880 |
| 20 | 440 | 904 | 1384 | 1864 | 2344 | 2792 | 3240 | 3752 | 4136 |
| 21 | 488 | 1000 | 1480 | 1992 | 2472 | 2984 | 3496 | 4008 | 4584 |
| 22 | 520 | 1064 | 1608 | 2152 | 2664 | 3240 | 3752 | 4264 | 4776 |
| 23 | 552 | 1128 | 1736 | 2280 | 2856 | 3496 | 4008 | 4584 | 5160 |
| 24 | 584 | 1192 | 1800 | 2408 | 2984 | 3624 | 4264 | 4968 | 5544 |
| 25 | 616 | 1256 | 1864 | 2536 | 3112 | 3752 | 4392 | 5160 | 5736 |
| 26 | 648 | 1320 | 1992 | 2664 | 3368 | 4008 | 4584 | 5352 | 5992 |

TBS table as shown in the above table 2 is designed based on normal PRB of general service, wherein in order to allow for the factors such as the system overhead for controlling the signalling and pilot as well as the extended and normal CP etc., the protocol finally assigns 120 RE downlink to each PRB-pair for carrying data, wherein 120 RE are equivalent to 10 OFDM symbols. Therefore table 2 is not suitable for the punctured PRB, particularly when more symbols are punctured. If a determination is made according to table 2, then it will lead to deviation from the actually needed MCS, and thereby resulting in decoding error of UE.

The above defect will be illustrated by the way of examples. It is assumed that UE obtains $I_{MCS}=14$ and the indicated number of PRB pair is 2 according to downlink scheduling signalling. For general downlink subframe, the processing of UE is as follows: according to table 1, when $I_{MCS}=14$, looking up table 1 to find the corresponding modulation scheme $Q_m=4$, i.e., 16QAM; the sequence number corresponding to $I_{TBS}=13$; then according to table 2, it is found that TBS=488. Therefore, the practical code rate is generally: (488+24)/(120×4×2)=0.533, i.e., the practical MCS is {16QAM, 0.533}.

However, for DwPTS, it is assumed that DwPTS has a length of 9 OFDM symbols, then in addition to the overhead for controlling signalling, channel synchronization and pilot, the PRB in the DwPTS which can be used to carry data is approximately 5×12=60RE. NodeB (base station) will arrange 4 PRB pairs for this UE if it is required to ensure identical transmission quality, that is, MCS needs to be {16QAM, 0.533} as well and carries 488 data bits. However, UE looks up the TBS table based on $I_{MCS}=14$ and $N_{PRB}=4$ which is indicated by signalling to obtain 1000 bits rather than 488 bits in fact, this will leads to error operation of UE.

Or, during scheduling NodeB considers that actually 488 bits are transmitted, then the value of TBS which is the most approximate to 488, for example 472, is selected with $N_{PRB}=4$. Now the corresponding $I_{MCS}=7$. When NodeB determines the transmission by means of $I_{MCS}=7$ and $N_{PRB}=4$, this will also result in error operation of UE as UE will be considered as MCS={QPSK, 1.06} for DwPTS, rather than MCS={16QAM, 0.533} which should be obtained. Therefore, for the punctured PRB pair in the above example, MCS {16QAM, 0.533} cannot be realized actually.

SUMMARY

The present invention aims to at least solve the above technical defects, in particular using the existing MCS and TBS table to improve spectrum efficiency during AMC by using punctured PRB.

For this purpose, as one aspect, the present invention proposes an adaptive modulation and coding method, comprising the following steps: the base station NodeB selects punctured PRB for the User Equipment (UE) to transmit the downlink data; the NodeB determines the Transport Block Size (TBS) and the number of punctured PRB pairs for transmission to the UE based on the carried service; the NodeB schedules the downlink data for the UE based on the determined TBS, and transmits the number of the used punctured PRB pairs and a Modulation and Coding Scheme (MCS) sequence number to the UE; and the UE is used for receiving the downlink data transmitted by the NodeB and the number of the used punctured PRB pairs and the MCS sequence number transmitted by the NodeB, and converting the number of the punctured PRB pairs to the number of normal PRB pairs, determining the modulation scheme and the TBS sequence number based on the MCS sequence number, and determining the TBS of the downlink data based based on the number of the normal PRB pairs and the TBS sequence number.

As another aspect, the present invention also proposes a NodeB, comprising a selection module, a scheduling parameter determination module, a scheduling module, wherein the selection module is used for selecting punctured PRB for the UE to transmit the downlink data; the scheduling parameter determination module is used for determining a Transport Block Size TBS and the number of punctured PRB pairs for transmission to the UE based on the carried service; the scheduling module is used for scheduling the downlink data for the UE based on the determined TBS, and transmitting the number of the used punctured PRB pairs and a MCS sequence number to the UE.

The present invention further proposes a UE, comprising a reception module, an indication information obtaining module, a conversion module and a TBS determination module, wherein the reception module is used for receiving the downlink data transmitted through the punctured PRB from the NodeB; the indication information obtaining module is used for obtaining the MCS sequence number and the number of the punctured PRB pairs indicated by the scheduling signalling; the conversion module is used for converting the number of the punctured PRB pairs to the number of normal PRB pairs and the TBS determination module is used for determining the modulation scheme and the TBS sequence number based on the MCS sequence number, as well as determining the TBS of the downlink data based on the number of the normal PRB pairs converted by the conversion module and the TBS sequence number.

The present invention further proposes an adaptive modulation and coding method, comprising the following steps: a transmitting node selects punctured PRB and normal PRB to transmit the downlink data; the transmitting node determines the Transport Block Size (TBS) and the number of total PRB pairs for transmission to the receiving node based on the carried service, the number of total PRB pairs is the summation of the number of the scheduled normal PRB pairs and the number of the scheduled punctured PRB pairs; the transmitting node schedules the downlink data for the receiving node based on the determined TBS, and transmits the number of the total used PRB pairs, location information and a Modulation and Coding Scheme (MCS) sequence number to the receiving node; the receiving node calculates the number of total resource based on the number of the total PRB pairs, location information and situation of respective punctured PRBs; the receiving node calculates the number normal PRB pairs after conversion based on the number of total resource, determines the TBS of the downlink data based on the calculated number of the normal PRB pairs after conversion and the TBS sequence number determined by the MCS sequence number.

The present invention further proposes an adaptive modulation and coding system, comprising a transmitting node and at least one receiving node served by the transmitting node, wherein the transmitting node is used for selecting punctured PRBs and normal PRBs to transmit the downlink data, and determining the Transport Block Size (TBS) and the number of the total PRB pairs for transmission to the receiving node based on the carried service, the number of the total PRB pairs being the summation of the number of the scheduled normal PRB pairs and the number of the scheduled punctured PRB pairs, and scheduling the downlink data for the receiving node based on the determined TBS, and transmitting the number of the total used PRB pairs, location information and a MCS sequence number to the receiving node; the receiving node is used for calculating the number of total resource based on the number of the total PRB pairs, the location information and the situation of each punctured PRB, and calculating the number normal PRB pairs after conversion based on the number of total resource, and determining the TBS of the downlink data based on the calculated number of the normal PRB pairs after conversion and the TBS sequence number determined by the MCS sequence number.

The present invention further proposes a transmitting node, comprising a selection module, a scheduling parameter determination module, a scheduling module, wherein the selection module is used for selecting punctured PRB and normal PRB to transmit the downlink data; the scheduling parameter determination module is used for determining the Transport Block Size (TBS) and the number of the total PRB pairs for transmission to the receiving node based on the carried service, the number of the total PRB pairs being the summation of the number of the scheduled normal PRB pairs and the number of the scheduled punctured PRB pairs; the scheduling module is used for scheduling the downlink data for the receiving node based on the determined TBS, and transmitting the number of the total used PRB pairs, location information and a MCS sequence number to the receiving node.

The present invention further proposes a receiving node, comprising a reception module, an indication information obtaining module, a normal PRB pair-number calculation module and a TBS determination module, wherein the reception module is used for receiving the downlink data transmitted through the normal and punctured PRB by the transmitting node; the indication information obtaining module is used for obtaining the MCS sequence number and the number of the total PRB pairs indicated by the scheduling signalling, the number of the total PRB pairs being the summation of the number of the scheduled normal PRB pairs and the number of the scheduled punctured PRB pairs; the normal PRB pair-number calculation module is used for calculating the number of the total resource based on the number of the total PRB pairs and the situation of each punctured PRB, and calculating the number of the normal PRB pairs after conversion based on the number of total resource; the TBS determination module is used for determining the TBS of the downlink data based on the calculated number of the normal PRB pairs after conversion and the TBS sequence number determined by the MCS sequence number.

The specific condition when downlink data are transmitted with punctured PRBs may be performed in the present invention on the basis of utilizing the existing resources and adaptive processing of the general subframes by performing conversion between the number of punctured PRBs and the number of normal PRBs in scheduling resource for the UE with the NodeB, which may be implemented simply and efficiently.

Additional aspects and advantages of the present invention will be illustrated in the following description and part of them will become apparent through the following description or be understood through the embodiments of the present invention.

BRIEF DESCRIPTION OF THE DRAWINGS

The above and/or additional aspects and advantages of the present invention will become apparent and easy to be understood through the following description of embodiments in conjunction with accompanying figures. Wherein.

DETAILED DESCRIPTION

Figure 1:
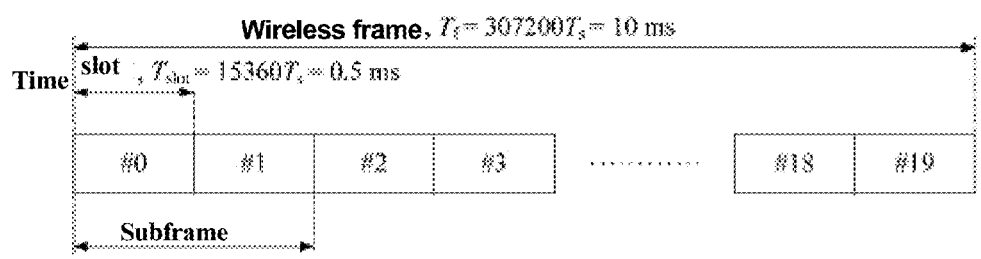
FIG. 1 is a schematic view of the first type frame structure of FDD system in the prior art.
Figure 2:
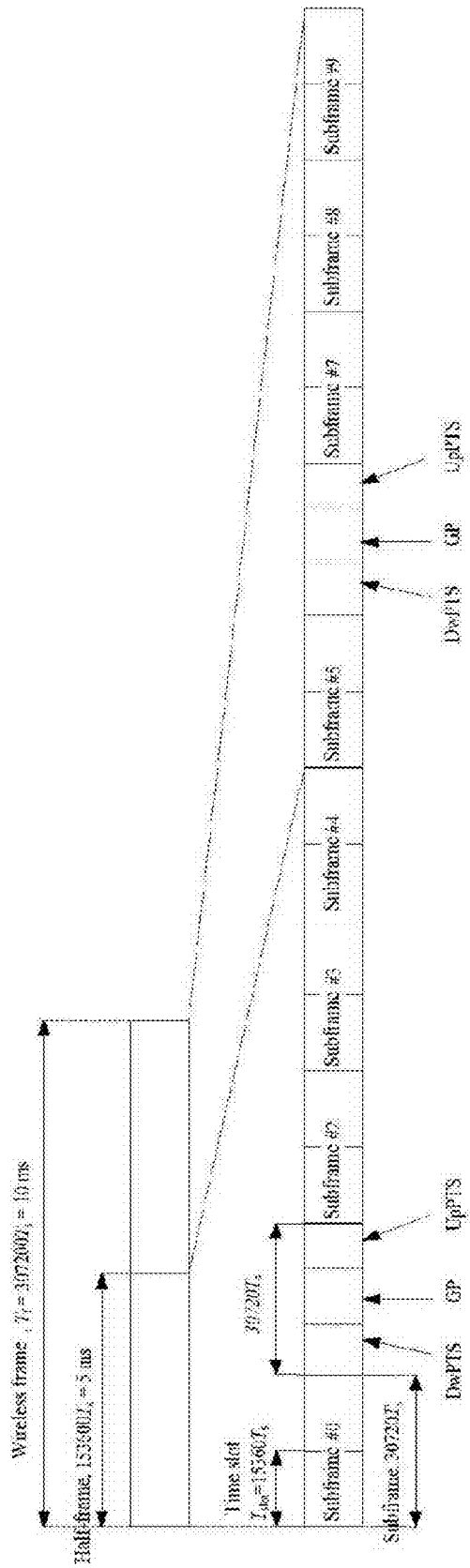
FIG. 2 is a schematic view of the second type frame structure of TDD system in the prior art.
Figure 3:
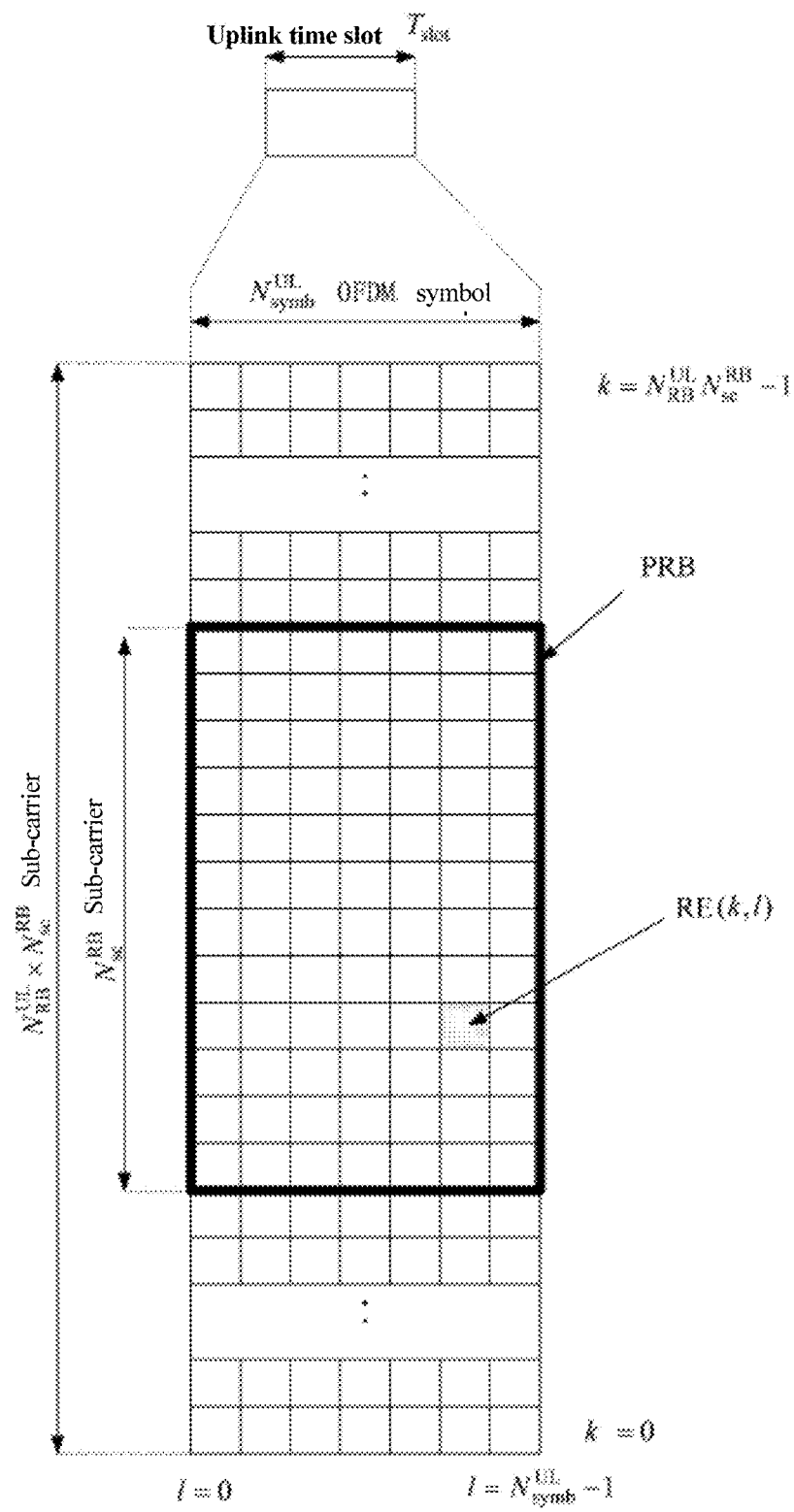
FIG. 3 is a schematic view of PRB and RE in uplink time slot in the prior art.

The embodiments of the present invention will be illustrated in detail. The examples of the embodiments are shown in figures, wherein identical or similar reference numbers refer to identical or similar features throughout. The following embodiments described with reference to figures are merely examples and are only used to illustrate the present invention rather than being construed as limiting the present invention.

The present invention mainly aims to overcome the technical defect that it is impossible to realize AMC using punctured PRB in the prior art with the adaptive processing and resources of the existing general subframes through conversion of NodeB and corresponding UE to the number of PRB pairs without changing the existing {TBS, MCS} tables (such as table 1 and table 2) and without adding new {TBS, MCS} tables to the punctured PRB. The specific process is briefly introduced as follows: firstly when NodeB schedules resource for UE, if NodeB selects punctured PRB to transmit downlink data for UE due to quality etc., then it is necessary for NodeB to covert the number of the normal scheduled PRB pairs $N_{PRB}$ to the number of the punctured PRB pairs $N_{P-PRB}$ according to the size of the punctured PRB as compared to the normal PRB, and to inform the UE of $N_{P-PRB}$ and the related information of PRB by a scheduling signalling. Wherein, the related information of PRB includes the specific number of PRBs and corresponding sequence number which carry this transmission. Similarly, UE will covert $N_{P-PRB}$ to the number of the normal PRB pairs according to $N_{P-PRB}$ and the related information of PRB in the scheduling signalling so as to look up the existing {TBS, MCS} table to perform AMC.

It should be further illustrated that, the size of the punctured PRB needs to be considered (size of normal PRB is already determined) for the conversion between the number of the normal PRB pairs $N_{PRB}$ and the number of punctured PRB pairs $N_{P-PRB}$, thus the conversion relationship between the number of the normal PRB pairs $N_{PRB}$ and the number of punctured PRB pairs $N_{P-PRB}$ will vary depending on the size of punctured PRB. For example, the normal PRB defined in the protocol contains 120 REs (or contains 10 OFDM symbols). If the punctured PRB contains 5 OFDM symbols, then $N_{P-PRB}=2\ N_{PRB}$; if the punctured PRB contains 30 REs, then $N_{P-PRB}=2.5 N_{PRB}$. Thus, it can be seen that the conversion relationship between the number of the normal PRB pairs and the number of the punctured PRB pairs varies with change of the size of the punctured PRBs. As there are various reasons for producing punctured PRBs in LTE system, the size of the punctured PRBs are different as well, therefore the conversion relationship between $N_{PRB}$ and $N_{P-PRB}$ cannot be listed exhaustively. Although the present invention will make an explanation to the instances for punctured PRB mainly existing in LTE system in the following embodiments, the present invention should not be limited to the instances for punctured PRB listed here, and other instances for punctured PRB should be covered by the scope of protection of the present invention. In addition, some simplification may be made during conversion, instead of totally depending upon the size relationship between the punctured PRB and the normal PRB. And such kind of conversion should also be covered by the scope of protection of the present invention.

It can be known through the above analysis, the main concept of the present invention is to perform AMC by using the existing {TBS, MCS} tables through conversion between $N_{PRB}$ and $N_{P-PRB}$ without designing new {TBS, MCS} tables necessarily for the punctured PRB. The conversion relationship between $N_{PRB}$ and $N_{P-PRB}$ will be different for different reasons leading to the punctured PRB. Although some main instances leading to punctured PRB are mentioned in the embodiments of the present invention and some corresponding conversion methods are proposed, these are only used for realizing rather than limiting the present invention. Therefore, the instances for punctured PRB and the corresponding conversion relationships not mentioned in the present invention but without departing from the above main concept of the present invention or based on the above main concept of the present invention should also be covered by the scope of protection of the present invention.

In order to further understand the following embodiments of the present invention, firstly the instances leading to punctured PRB mainly existing in the current LTE system and the corresponding size of punctured PRB are generalized. However, it is necessary to emphasize again that the following listed situations cannot sum up all instances leading to punctured PRB in the current LTE system, and other instances leading to punctured PRB are similar to what are listed here. A person skilled in the art could perform similar processing to the other punctured instances according to the present invention, thereby the other punctured instances should also be covered by the scope of protection of the present invention.

1. Punctured PRB Caused by the Length of DwPTS

TDD system of the current LTE supports various specific service subframe configuration, in which DwPTS, Gp and UpPTS take up 1 ms together. However, in different configuration, the length of DwPTS may be different, and, the possible length of DwPTS according to the current configuration includes as follows:

TABLE 3 a list for the length of DwPTS under different specific time slot configurations

| CP length | DwPTS's length (the number of OFDM symbols $L_{DwPTS}$) | | | | |
|---|---|---|---|---|---|
| Normal CP | 12 | 11 | 10 | 9 | 3 |
| Extended CP | 10 | 9 | 8 | 3 | |

According to different configurations of DwPTS's length in the above table 3, the overhead for controlling signalling and pilot are so considered. The number of OFDM symbols $N_{symbol,P\text{-}PRB}$ for punctured PRB pairs is shown in the following table:

TABLE 4 a list of the number of symbols for punctured PRB pairs

| Type | Number of available OFDM symbols $LP\_PRB$ | $N_{symbol,}P\_PRB$ |
|---|---|---|
| normal CP 1 | 12 | 8 |
| normal CP 2 | 11 | 7 |
| normal CP 3 | 10 | 6 |
| normal CP 4 | 9 | 5 |
| normal CP 5 | 3 | — |
| extended CP1 | 10 | 8 |
| extended CP2 | 9 | 7 |
| extended CP3 | 8 | 6 |
| extended CP4 | 3 | — |

For example, when DwPTS's length is configured as 12 OFDM symbols in table 3, there will be approximately 8 OFDM symbols available for data transmission after removing overhead for controlling signalling and pilot, thus $N_{symbol,P\text{-}PRB}=8$. Other instances in table 4 are similar and redundant descriptions will not be repeated.

2. Punctured PRB Caused by the Influence of Broadcast and Synchronization Channel The influences of broadcast and synchronization channel on FDD system and TDD system are different, which will be discussed with reference to drawings.

1) FDD System

Figure 4:
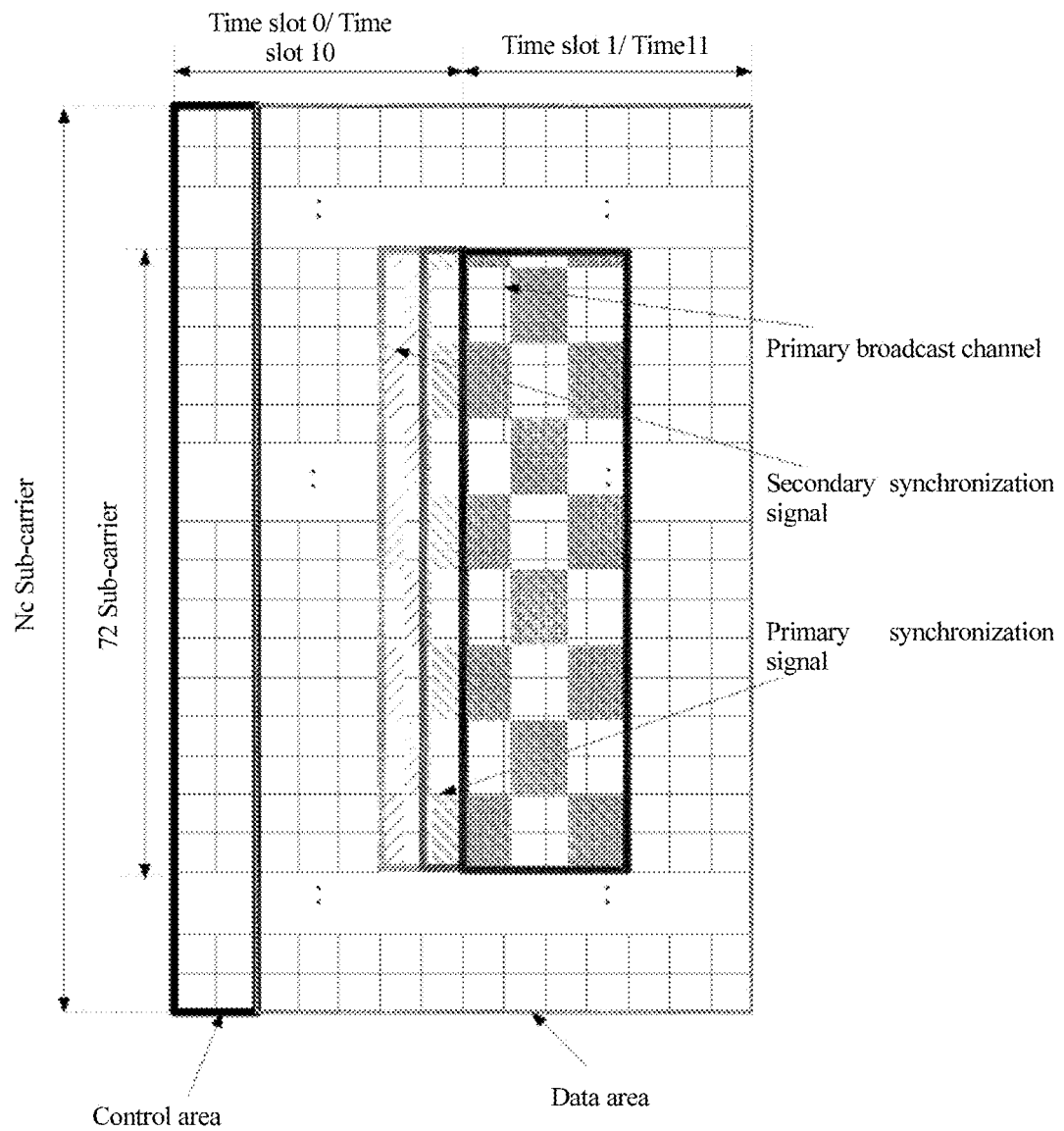
FIG. 4 schematically shows the locations of primary broadcast channel, secondary synchronization signal and primary synchronization signal in FDD system according to one embodiment of the present invention.

FIG. 4 schematically shows locations of primary broadcast channel, secondary synchronization signal and primary synchronization signal in FDD system in one embodiment of the present invention. In this figure, a normal CP is taken as an example having a length of 14 OFDM symbols, which is similar to the extended CP and redundant descriptions will not be repeated. For 72 sub-carriers (equivalent to 6PRB) between subframe 0 and subframe 5 in FDD system, the number of OFDM symbols available for data transmission is decreased due to the existence of synchronization channel or primary broadcast channel. For example, if the control channel takes up 2 symbols of resource, the primary broadcast channel takes up 4 symbols, secondary synchronization signal and primary synchronization signal each takes up one OFDM symbol, then the number of OFDM symbols available for data transmission in each PRB is 14-2-4-1-1=6. That is, for FDD system, its subframe 0 and subframe 5 are specific service subframes and their PRBs are punctured.

For FDD system, the number of OFDM symbols $L_{P\text{-}PRB}$ available in subframe 0 and subframe 5, as well as the number of OFDM symbols $N_{symbol,P\text{-}PRB}$ corresponding to punctured PRB after considering the overhead for controlling signalling and pilot are listed as follows:

TABLE 5 a list of the number of symbols $N_{symbol,}P\_PRB$ corresponding to punctured PRB in FDD system

| Type | | Number of available OFDM symbols $LP\_PRB$ | $N_{symbol,}P\_PRB$ |
|---|---|---|---|
| normal CP | subframe 0 | 8 | 4 |
| | subframe 5 | 12 | 8 |
| extended CP | subframe 0 | 6 | 4 |
| | subframe 5 | 10 | 8 |

2) TDD System

Figure 5:
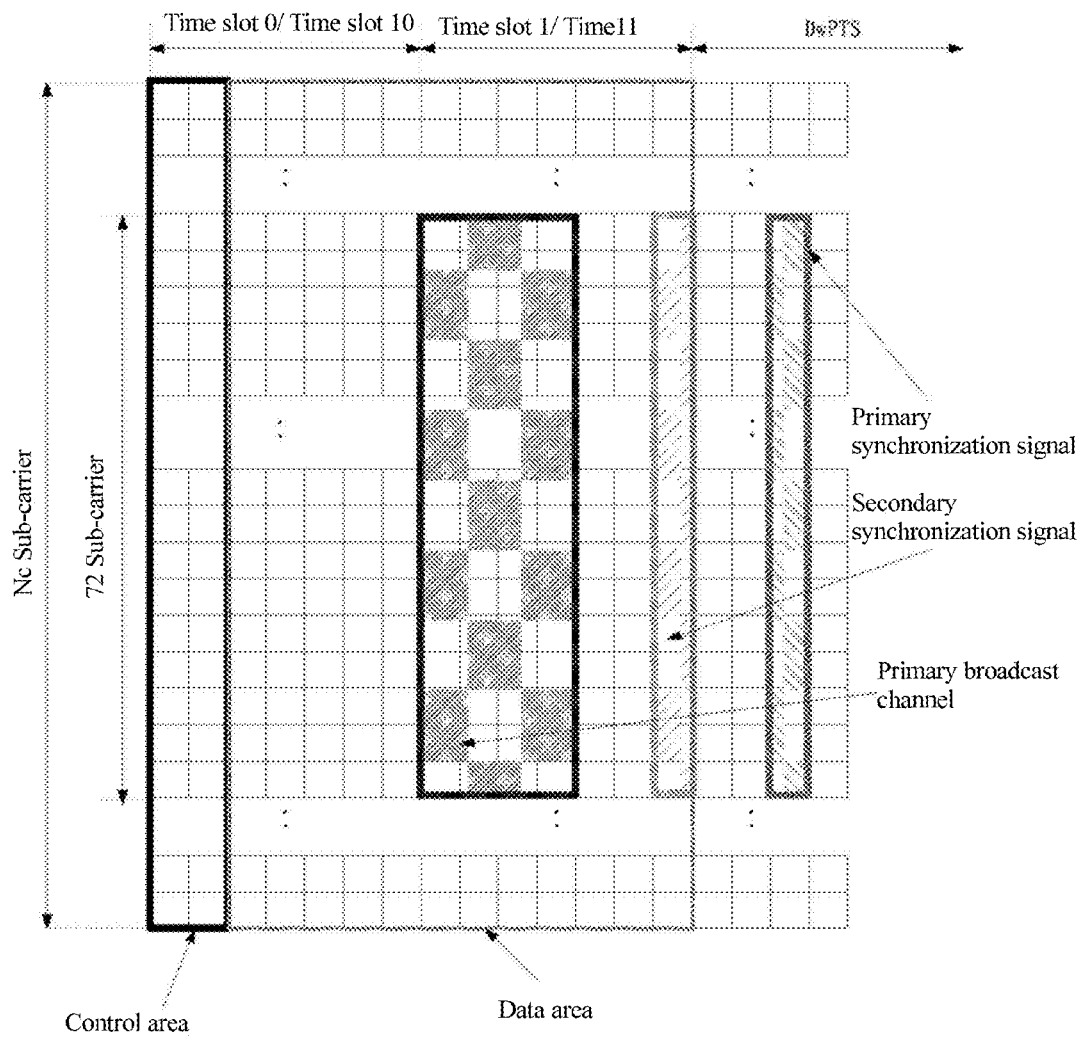
FIG. 5 schematically shows the locations of primary broadcast channel, secondary synchronization signal and primary synchronization signal in TDD system in one embodiment of the present invention.

FIG. 5 schematically shows locations of primary broadcast channel, secondary synchronization signal and primary synchronization signal in TDD system in one embodiment of the present invention. In this figure, a normal CP is also taken as an example having a length of 14 OFDM symbols. However, the difference between TDD system and the above FDD system is in that the primary synchronization signal is not in subframe 0 and subframe 5 but in DwPTS of subframe 1 and subframe 6. For TDD system, the number of OFDM symbols $L_{P\text{-}PRB}$ available in subframe 0, subframe 5 and subframe 6, as well as the number of OFDM symbols $N_{symbol,P\text{-}PRB}$ corresponding to punctured PRB after considering the overhead for controlling signalling and pilot are listed as follows:

TABLE 6 a list of the number of symbols $N_{symbol,}P\_PRB$ corresponding to punctured PRB in TDD system

| Type | | Number of available OFDM symbols $LP\_PRB$ | $N_{symbol,}P\_PRB$ |
|---|---|---|---|
| normal CP | subframe 0 | 9 | 5 |
| | subframe 5 | 13 | 9 |
| | subframe 6 | 13 | 9 |
| extended CP | subframe 0 | 7 | 5 |
| | subframe 5 | 11 | 9 |
| | subframe 6 | 11 | 9 |

3. Punctured PRB caused by Sounding Reference Signaling (SRS)

If uplink subframe is configured to transmit SRS, the last OFDM symbol in PRB of PUSCH will be punctured. However, as only one OFDM symbol is lost in this instance instead of more OFDM symbols being lost in the above two instances, redundant descriptions will not be repeated in the present invention. However, a person skilled in the art could solve the problem of punctured PRB caused by SRS according to the processing to the above two instances proposed by the present invention.

It can be seen from the above listed instances in which punctured PRB is produced that, as the punctured PRB will lost more OFDM symbols which is caused by the influence of the length configuration of DwPTS as well as the broadcast and synchronization channel, the system is correspondingly influenced. Therefore, in one preferred embodiment of the present invention, the conversion is performed only taking the above two instances of producing punctured PRB into consideration for the sake of efficiency. But it should be understood that the solution proposed in the embodiments of the present invention are also applicable to other instances in which punctured PRB is produced. As there are many other instances in which punctured PRB is produced, redundant descriptions will not be repeated herein.

In one embodiment of the present invention, the punctured PRB caused by the length configuration of DwPTS as well as the broadcast and synchronization channel is generalized. Table 7 can be obtained as follows by combining tables 4, 5, 6 according to the number of symbol of punctured PRB without considering the difference of pilot overhead caused by puncturing different symbols.

| Type | Number of available OFDM symbols $L_{P\_PRB}$ | | $N_{symbol, P\_PRB}$ | RE number $NRE\_P\_PRB$ |
|---|---|---|---|---|
| | normal CP | Extended CP | | |
| 1 | 13 | 11 | 9 | 108 |
| 2 | 12 | 10 | 8 | 96 |
| 3 | 11 | 9 | 7 | 84 |
| 4 | 10 | 8 | 6 | 72 |
| 5 | 9 | 7 | 5 | 60 |
| 6 | 8 | 6 | 4 | 48 |

According to table 7, under the same MCS condition, the ratio of the number of normal PRB pairs to the number of punctured PRB pairs during transmission of some TBS is $$\frac{N_{PRB}}{N_{P\text{-}PRB}} \approx \frac{N_{RE,P\text{-}PRB}}{120} \approx \frac{N_{symbol,P\text{-}PRB}}{10}.$$

This formula is obtained in combination with the provisions of the size of the normal PRB in the protocol. As mentioned in the description on Table 2, the size of the normal PRB pairs is 120 REs or 10 OFDM symbols.

It is only one preferred embodiment of the present invention to combine tables 4, 5, 6 to obtain the table 7, and to obtain the conversion relationship between the normal PRB pairs $N_{PRB}$ and the punctured PRB pairs $N_{P\text{-}PRB}$ according to table 7.

In one embodiment of the present invention, the conversion relationship between the number of normal PRB pairs and the number of punctured PRB pairs is determined mainly based on the size of punctured PRB. The above formula is only one preferred embodiment of the present invention with the assumption that the size of the normal PRB pairs is 120 REs or 10 OFDM symbols. However, the present invention proposes a more universal conversion relationship, which is determined by the formula of spectrum efficiency $$\frac{TBS}{N_{P\text{-}PRB} \times N_{RE,P\text{-}PRB}} \approx \frac{TBS}{N_{PRB} \times N_{RE,PRB}} \text{ or}$$

$$\frac{TBS}{N_{P\text{-}PRB} \times N_{symbol,P\text{-}PRB}} \approx \frac{TBS}{N_{PRB} \times N_{symbol,PRB}},$$

wherein TBS is the size of carrying data blocks; $N_{P\text{-}PRB}$ is the number of punctured PRB pairs necessary for carrying the TBS; $N_{PRB}$ is the number of normal PRB pairs necessary for carrying the TBS; $N_{symbol,P\text{-}PRB}$ is the number of OFDM symbols in each pair of punctured PRBs for carrying the TBS; $N_{symbol,PRB}$ is the number of OFDM symbols in each pair of normal PRBs for carrying the TBS; $N_{RE,P\text{-}PRB}$ is the number of REs occupied by the punctured PRB; $N_{RE,PRB}$ is the number of REs occupied by the normal PRB. Furthermore, according to the above formula, the conversion relationship between the number of normal PRB pairs and the number of punctured PRB pairs can be determined by the formula of $$\frac{N_{PRB}}{N_{P\text{-}PRB}} \approx \frac{N_{RE,P\text{-}PRB}}{N_{RE,PRB}} \approx \frac{N_{symbol,P\text{-}PRB}}{N_{symbol,PRB}}.$$

In one embodiment of the present invention, the conversion relationship between the number of normal PRB pairs and the number of punctured PRB pairs can also be determined by $$N_{PRB} = \left\lfloor \frac{N_{P\text{-}PRB} N_{symbol,P\text{-}PRB}}{N_{symbol,PRB}} \right\rfloor,$$

wherein $\lfloor x \rfloor$ means performing a rounding-down operation to x.

In one embodiment of the present invention, $N_{symbol,PRB}$ is preferably 10, $N_{RE,P\text{-}PRB}$ is preferably 120 in the above formula. The present invention proposes three solutions of calculation means for $N_{symbol,P\text{-}PRB}$ or $N_{RE,P\text{-}PRB}$.

Solution 1:

$N_{symbol,P\text{-}PRB}$ or $N_{RE,P\text{-}PRB}$ can be obtained by looking up table 7 according to the number of OFDM symbols available for punctured PRB pairs.

Solution 2:

$N_{symbol,P\text{-}PRB}$ is determined by the formula $N_{symbol,P\text{-}PRB}=L_{symbol,P\text{-}PRB}-k$, wherein $L_{symbol,P\text{-}PRB}$ represents the number of OFDM symbols available for punctured PRB pairs, and k is a constant related to the length of CP. In one embodiment of the present invention, k=4 for normal CP; and k=2 for extended CP.

Solution 3:

This solution is a way of simplification. If the size of punctured PRB pairs is smaller than some threshold value, then the number of symbols of punctured PRB pairs is set to a predetermined value. For example, if the size of punctured PRB pairs is smaller than threshold value $k_0$, then it is defaulted that the number of symbols of punctured PRB pairs is constant $k_1$, wherein $k_0, k_1$ are constant. In one embodiment of the present invention, it is $k_0=12$, $k_1=5$ for normal CP and $k_0=10$, $k_1=5$ for extended CP.

Certainly, a person skilled in the art could also find other formulae according to other principles under the same MCS conditions or use other similar means to determine the conversion relationship between the number of normal PRB pairs and the number of punctured PRB pairs. The specific conversion relationship can be simplified according to the number of OFDM symbols. For example, if 1 or 2 OFDM symbols are punctured, then it is processed as a normal PRB; if 3 or 4 OFDM symbols are punctured, then it is processed as the punctured PRB pairs having 7 OFDM symbols; if 5 or more OFDM symbols are punctured, then it is processed as punctured PRB pairs having 5 OFDM symbols. Thus it should also be noticed that there are many ways to determine the conversion relationship between the number of normal PRB pairs $N_{PRB}$ and the number of punctured PRB pairs $N_{P\text{-}PRB}$, and the present invention only proposes a preferred embodiment and is not limited to this solution. Other conversion solutions based on the main concept of the present invention should be covered by the scope of protection of the present invention.

Embodiment 1

Figure 6:
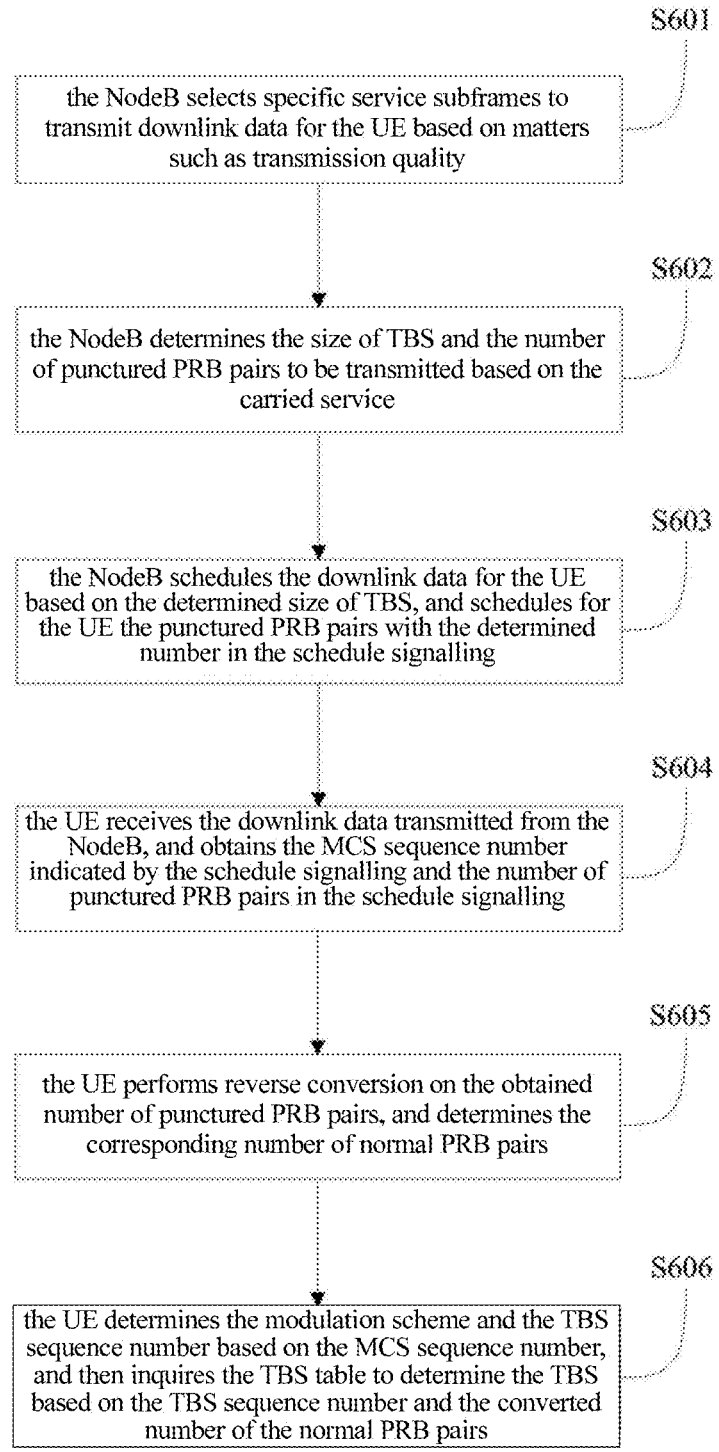
FIG. 6 is a flowchart of an adaptive modulation and coding method according to the embodiment 1 of the present invention.

FIG. 6 is a flowchart of an adaptive modulation and coding method according to embodiment 1 of the present invention, in which it is only considered that NodeB selects specific service subframes to transmit downlink data for the UE. As the instance that NodeB selects general service subframes for the UE is the same as in the prior art, redundant descriptions will not be repeated herein. This method includes the following steps:

S601, the NodeB selects specific service subframes for the UE to transmit downlink data based on matters such as transmission quality. The PRB in the specific service subframes is the punctured PRB and the size of its punctured PRB is related to the specific service subframes. The specific service subframes are e.g. subframe 0, subframe 5 in FDD system, subframe 0, subframe 5 and subframe 6 in TDD system etc. Furthermore, due to the difference among the specific service subframes, the sizes of punctured PRBs thereof are different either. For example, referring to tables 5 and 6, the punctured PRB in the subframe 0 of FDD system contains 4 OFDM symbols, and the punctured PRB in the subframe 0 of TDD system contains 4 OFDM symbols. Certainly, the specific service subframes in LTE system are not limited to subframe 0, subframe 5 in FDD system and subframe 0, subframe 5 and subframe 6 in TDD system, but other subframes. For convenience of description, only the above subframes are used as examples in the following embodiments, and the sizes of their corresponding punctured PRB may refer to tables 5 and 6.

S602, the NodeB determines the size of TBS and the number of punctured PRB pairs $N_{P-PRB}$ to be transmitted based on the carried service. The way for determining the size of TBS to be transmitted are different depending upon different carried services.

For VoIP service, as an example, its transmitted TBS has a constant size and cannot be divided, thus it is required to determine the size of TBS according to the carried service, and further to determine the optimum number of normal PRB pairs $N_{PRB}$ based on the size of TBS as well as the channel quality information. Then, the number of punctured PRB pairs $N_{P-PRB}$ is obtained by converting the number of normal PRB pairs $N_{PRB}$ accordingly. Wherein, the conversion relationship between $N_{PRB}$ and $N_{P-PRB}$ can be determined according to the size of punctured PRB, and can also be determined based on simplification processing, or based on the formula of $$\frac{N_{PRB}}{N_{P-PRB}} \approx \frac{N_{RE,P-PRB}}{120} \approx \frac{N_{symbol,P-PRB}}{10} \text{ or}$$

$$N_{PRB} = \left\lfloor \frac{N_{P-PRB} N_{symbol,P-PRB}}{N_{symbol,PRB}} \right\rfloor$$

as a preferred embodiment of the present invention.

However, for the data service, its entire data for transmission is huge, thus it needs to be divided according to the TBS that can be carried in each transmission. The NodeB selects the size of TBS based on channel quality information and the schedulable resource. After the NodeB selects the number of punctured PRB pairs $N_{P-PRB}$ based on the schedulable resource, the number of punctured PRB pairs $N_{P-PRB}$ is converted so as to obtain the number of normal PRB pairs $N_{PRB}$ accordingly. Finally, TBS is obtained by looking up the existing TBS table according to the number of normal PRB pairs $N_{PRB}$.

S603, the NodeB schedules the downlink data for UE based on the determined size of TBS, and schedules $N_{P-PRB}$ punctured PRB pairs for the UE in the scheduling signalling, and informs the UE of the number of the used punctured PRB pairs $N_{P-PRB}$.

S604, the UE receives the downlink data transmitted from the NodeB, and obtains the MCS sequence number $I_{MCS}$ indicated by the schedule signalling and the number of punctured PRB pairs $N_{P-PRB}$ in the schedule signalling.

S605, the UE could know from the system information whether the NodeB transmits downlink data by the specific service subframes, and thereby the UE performs reverse conversion on the obtained number of punctured PRB pairs $N_{P-PRB}$, and determines the corresponding number of normal PRB pairs $N_{PRB}$. Similarly, the conversion relationship between $N_{PRB}$ and $N_{P-PRB}$ can be determined according to the size of punctured PRB, and can also be determined based on simplification processing, or based on the formula of $$\frac{N_{PRB}}{N_{P-PRB}} \approx \frac{N_{RE,P-PRB}}{120} \approx \frac{N_{symbol,P-PRB}}{10} \text{ or}$$

$$N_{PRB} = \left\lfloor \frac{N_{P-PRB} N_{symbol,P-PRB}}{N_{symbol,PRB}} \right\rfloor$$

as a preferred embodiment of the present invention.

S606, the UE determines the modulation scheme $Q_m$ and the TBS sequence number $I_{TBS}$ (see table 1) based on the MCS sequence number $I_{MCS}$, and then looks up the TBS table to determine the TBS of downlink data based on the TBS sequence number $I_{TBS}$ and the converted number of the normal PRB pairs $N_{PRB}$.

In one embodiment of the above the method, when the code word is mapped to an n-layer spatial multiplexing (n is positive integer), the number of the punctured PRB pairs and the number of the normal PRB pairs are multiplied by n. For example, as to the mode of mapping one code word to a 2-layer spatial multiplexing, the above $N_{RE,P-PRB}$ or $N_{symbol,P-PRB}$ are replaced by $2*N_{RE,P-PRB}$ or $2*N_{symbol,P-PRB}$.

Figure 7:
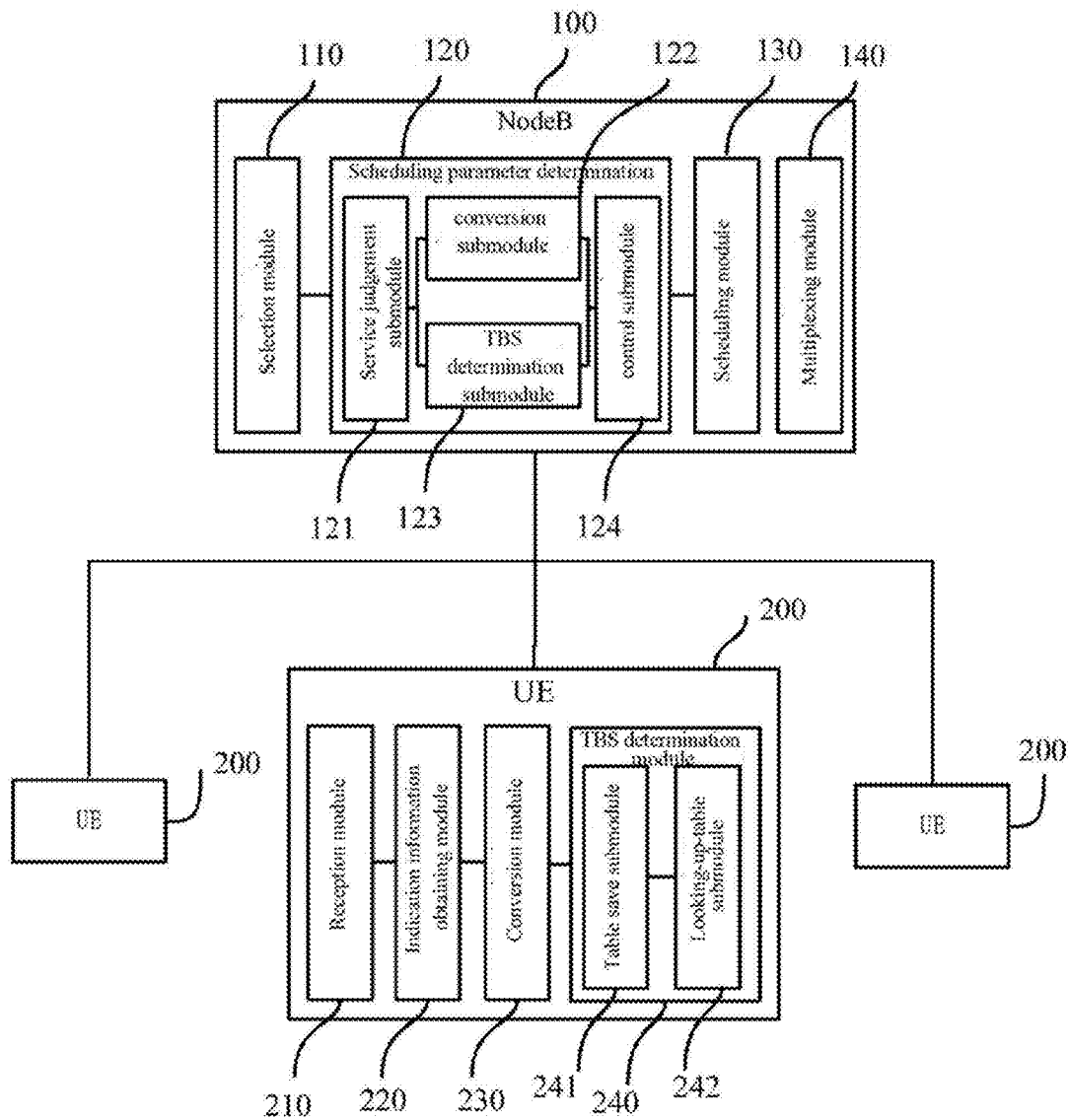
FIG. 7 is a structural view of an adaptive modulation and coding system according to the embodiment 1 of the present invention.

FIG. 7 is a structural view of an adaptive modulation and coding system according to one embodiment of the present invention. The system includes a NodeB 100 and at least one UE 200 being served by this NodeB 100. The NodeB 100 selects specific service subframes, in which the physical block PRB is the punctured PRB, for the UE 200 to transmit downlink data, and schedules the downlink data for the UE 200 based on the determined TBS, and then transmits the number of the used punctured PRB pairs and a MCS sequence number to the UE 200; the UE 200 is used for receiving the downlink data transmitted by the NodeB 100 and the number of the used punctured PRB pairs and the MCS sequence number transmitted by the NodeB, and converting the received number of the punctured PRB pairs to the number of normal PRB pairs, as well as determining the modulation and coding scheme MCS based on the number of the normal PRB pairs and the MCS sequence number.

In one embodiment of the present invention, the NodeB 100 comprises a selection module 110, a scheduling parameter determination module 120, and a scheduling module 130. The selection module 110 is used for selecting specific service subframes, in which the physical block PRB is the punctured PRB, for the UE 200 to transmit the downlink data. The scheduling parameter determination module 120 is used for determining the Transport Block Size TBS and the number of punctured PRB pairs for transmission to the UE 200 based on the carried service. The scheduling module 130 is used for scheduling the downlink data for the UE 200 based on the determined TBS, and then transmitting the number of the used punctured PRB pairs and a MCS sequence number to the UE 200.

In one embodiment of the present invention, the scheduling parameter determination module 120 includes a service judgement submodule 121, a conversion submodule 122, a TBS determination submodule 123 and a control submodule 124. The service judgement submodule 121 is used for judging the carried service is VoIP service or data service. The conversion submodule 122 is used for realizing the conversion between the number of the normal PRB pairs to the number of punctured PRB pairs. The TBS determination submodule 123 is used for determining the TBS based on the carried service upon the service judgement submodule 121 judged the carried service as VoIP service, and based on the number of the normal PRB pairs converted by the conversion submodule 122 upon the service judgement submodule 121 judged the carried service as data service. The control submodule 124 is used for firstly determining the TBS based on the carried service by the TBS determination submodule 123 upon the service judgement submodule 121 has judged the carried service as VoIP service, and determining the number of the normal PRB pairs based on the TBS determined by the TBS determination submodule 123 and channel quality information, and then obtaining the number of punctured PRB pairs by converting the number of the normal PRB pairs by the conversion submodule 122. Furthermore, the control submodule is also used for firstly determining the number of the punctured PRB pairs based on the schedulable resource upon the service judgement submodule 121 has judged the carried service as data service, and obtaining the number of normal PRB pairs by converting the number of punctured PRB pairs by the conversion module 122, and then obtaining TBS by looking up tables with the TBS module 123 according to the number of normal PRB pairs.

In one embodiment of the present invention, the conversion module 122 determines the conversion relationship between the number of normal PRB pairs and the number of punctured PRB pairs according to the size of punctured PRB or the simplification processing. In the above embodiment, the conversion module 122 determines the conversion relationship between the number of normal PRB pairs and the number of punctured PRB pairs based on the formula of $$\frac{N_{PRB}}{N_{P\text{-}PRB}} \approx \frac{N_{RE,P\text{-}PRB}}{120} \approx \frac{N_{symbol,P\text{-}PRB}}{10} \text{ or}$$

$$N_{PRB} = \left\lfloor \frac{N_{P\text{-}PRB} N_{symbol,P\text{-}PRB}}{N_{symbol,PRB}} \right\rfloor,$$

wherein $N_{P\text{-}PRB}$ is the number of punctured PRB pairs, $N_{PRB}$ is the number of normal PRB pairs, $N_{symbol,P\text{-}PRB}$ represents the number of orthogonal frequency division multiplexing OFDM symbols occupied by punctured PRB, and $N_{RE,P\text{-}PRB}$ represents the number of REs occupied by punctured PRB.

In the above embodiment, the NodeB 100 further includes a multiplexing module 140 for multiplying the number of punctured PRB pairs and the number of normal PRB pairs by n (n is positive integer) when the code word is mapped to an n-layer spatial multiplexing.

In one embodiment of the present invention, the UE 200 comprises a reception module 210, an indication information obtaining module 220, a conversion module 230 and a TBS determination module 240. The reception module 210 is used for receiving the downlink data transmitted through specific service subframes by the NodeB 100. The indication information obtaining module 220 is used for obtaining the number of the punctured PRB pairs and the MCS sequence number indicated by the scheduling signalling. The conversion module 230 is used for converting the number of the punctured PRB pairs to the number of normal PRB pairs. The TBS determination module 240 is used for determining the TBS of the downlink data based on the number of the normal PRB pairs converted by the conversion module and the MCS sequence number obtained by the indication information obtaining module.

In one embodiment of the present invention, The TBS determination module 240 includes a table save submodule 241 and a looking-up-table submodule 242. The table save submodule 241 is used for saving the list of the modulation scheme corresponding to the MCS sequence number and the list of the TBS sequence number as well as TBS tables, such as the above tables 1 and 2. The looking-up-table submodule 242 is used for determining the modulation scheme and TBS sequence number according to the MCS sequence number obtained by the indication information obtaining module 220, and then determining the TBS of the downlink data based on the number of the normal PRB pairs converted by the conversion module 230 and the TBS sequence number.

In one embodiment of the present invention, the conversion module 230 determines the conversion relationship between the number of normal PRB pairs and the number of punctured PRB pairs according to the size of punctured PRB or the simplification processing.

In the above embodiment, the conversion module 230 determines the conversion relationship between the number of normal PRB pairs and the number of punctured PRB pairs based on the formula of $$\frac{N_{PRB}}{N_{P\text{-}PRB}} \approx \frac{N_{RE,P\text{-}PRB}}{120} \approx \frac{N_{symbol,P\text{-}PRB}}{10} \text{ or}$$

$$N_{PRB} = \left\lfloor \frac{N_{P\text{-}PRB} N_{symbol,P\text{-}PRB}}{N_{symbol,PRB}} \right\rfloor,$$

wherein $N_{P\text{-}PRB}$ is the number of punctured PRB pairs, $N_{PRB}$ is the number of normal PRB pairs, $N_{symbol,P\text{-}PRB}$ represents the number of OFDM symbols occupied by the punctured PRB, $N_{RE,P\text{-}PRB}$ represents the number of REs occupied by the punctured PRB. In the above embodiments of the UE and the NodeB, the conversion relationship between the number of normal PRB pairs and the number of punctured PRB pairs is similar to the conversion relationship in the above embodiments, and redundant descriptions will not be repeated.

The specific condition when downlink data are transmitted with punctured PRBs may be performed in the present invention on the basis of utilizing the existing resources and adaptive processing of the general subframes by performing conversion between the number of punctured PRBs and the number of normal PRBs in scheduling resource for the UE with the NodeB, which may be implemented simply and efficiently.

The above embodiments are all the embodiments for the instances of transmitting downlink data with punctured PRBs, but there are also instances of transmitting downlink data with both normal and punctured PRBs by NodeB. Based on the above, the present invention also proposes an adaptive modulation and coding method and apparatus when downlink data are transmitted with both normal and punctured PRBs.

Embodiment 2

Figure 8:
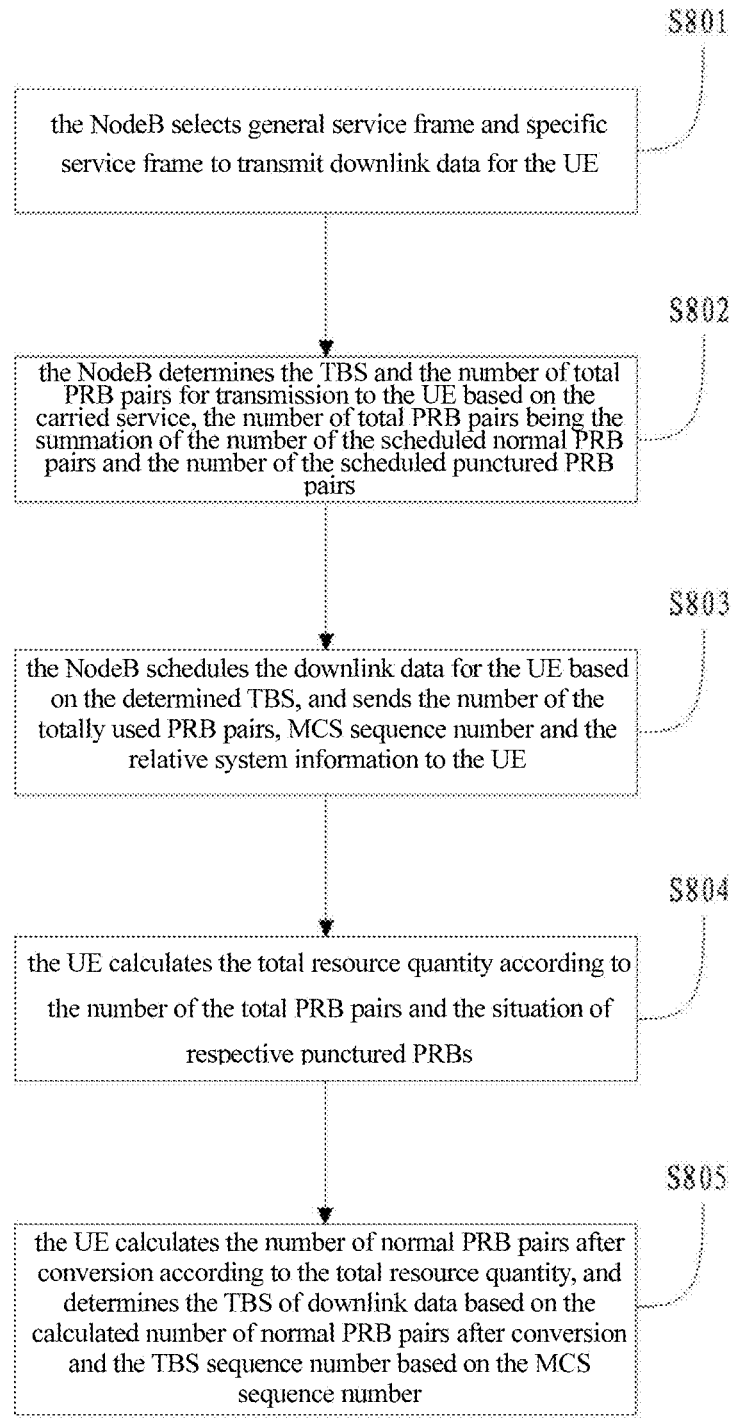
FIG. 8 is a flowchart of an adaptive modulation and coding method according to the embodiment 2 of the present invention.

FIG. 8 is a flowchart of an adaptive modulation and coding method according to the embodiment 2 of the present invention, and the method includes the following steps:

S801 The NodeB selects punctured PRB and normal PRB for the UE to transmit downlink data. In one embodiment of the present invention, each normal PRB pair contains 120 REs for carrying data, wherein 120 REs are equivalent to 10 OFDM symbols. Punctured PRB may be caused by the influences of DwPTS's length configuration or broadcast and synchronization channel. As described in the above embodiment, the number of OFDM symbols or REs are different in punctured PRBs caused by different influences, redundant descriptions will not be repeated.

S802, the NodeB determines the TBS and the number of total PRB pairs to be transmitted to UE based on the carried service. The number of total PRB pairs is the summation of the number of the scheduled normal PRB pairs and the number of the scheduled punctured PRB pairs. The way for determining the size of TBS to be transmitted are different depending upon different carried services.

For the service having a constant size of data packet (such as VoIP service), as an example, the size of transmitted TBS is fixed and cannot be divided, thus it is required to determine the size of TBS according to the carried service, and further to determine the specific number of PRB pairs $N_{PRB}$ for carrying this data block according to the size of TBS as well as the channel quality information. Then the NodeB selects normal PRB and punctured PRB for the UE to transmit downlink data according to the schedulable resource, namely the NodeB schedules a part of normal PRB ($N_{PRB1}$) for the UE, and also schedules a part of punctured PRB for the UE in which there may be various PRB pairs having different granularities. For example, punctured PRB caused by the influence of broadcast- and synchronization channel and/or punctured PRB caused by the influence of DwPTS's length, or other punctured PRB may be used. Wherein, the number of punctured PRB pairs should be obtained by conversion, for example, for punctured PRB caused by the influence of DwPTS's length, based on $N_{P-PRB}=\lceil N_{PRB} \times 10/N_{symbol,P-PRB}\rceil$ or $N_{P-PRB}=\lceil N_{PRB} \times 120/N_{RE,P-PRB}\rceil$, wherein $N_{PRB}$ is the number of normal PRB pairs (except for the scheduled part of normal PRB ($N_{PRB1}$) for the UE), $N_{P-PRB}$ is the number of converted punctured PRB pairs, $N_{symbol,P-PRB}$ represents the number of OFDM symbols occupied by punctured PRB, $N_{RE,P-PRB}$ represents the number of RE occupied by punctured PRB. The number of the total PRB pairs is the summation of the scheduled part of normal PRB ($N_{PRB1}$) for the UE and the number of converted punctured PRB pairs $N_{P-PRB}$.

However, for the service having an unfixed size of data packet (such as data service), its entire data for transmission is huge, thus it needs to be divided according to the TBS that can be carried in each transmission. The NodeB selects the size of TBS based on channel quality information and the schedulable resource. Firstly, after the NodeB selects the number of scheduled normal PRB pairs and the number of punctured PRB pairs based on the schedulable resource, the NodeB calculates number of the total PRB pairs as the summation of the normal PRB pairs and the number of punctured PRB pairs assuming that the NodeB schedules $N_{PRB1}$ normal PRB pairs for the UE and schedules $N_{P-PRB}$ punctured PRB pairs for the UE at the same time. The NodeB obtains the number of normal PRB pairs $N_{PRB}$ by converting the number of punctured PRB pairs, and then looks up the table according to the sum of $N_{PRB1}$ and $N_{PRB}$ to obtain TBS and schedules a data packet with a size of TBS to to be transmitted on determined PRB. Specifically, the conversion relationship between the normal PRB pairs and the punctured PRB pairs can be determined according to the size of punctured PRB. For example, it can be calculated based on the formula of $N_{PRB}=\lfloor N_{P-PRB} \times N_{symbol,P-PRB}/10 \rfloor$ or $\lfloor N_{P-PRB}=N_{RE,P-PRB}/120 \rfloor$.

S803, the NodeB schedules the downlink data for UE based on the determined TBS, and sends the number of the totally used PRB pairs, location information and the related system information to UE.

S804, the UE calculates the number of the total resource according to the number of the total PRB pairs, location information and the situation of respective punctured PRBs. In particular, UE may know which PRB is punctured PRB and which PRB is normal PRB in the number of the total PRB pairs according to location information, and could calculate the number of total resource quantity according to the situation of respective punctured PRBs. In one embodiment of the present invention, one code word is scheduled to be carried on various PRB pairs having different granularities resources, that is, various punctured PRBs are scheduled for the UE, in this way the total resource quantity can be calculated with the formula of $$\sum_i R_i \times N_i,$$

wherein Ri is resource granularity of each kind of PRB, Ni is the number of each kind of PRB, i=1, . . . n, n is the number of total PRB pairs, namely for normal PRB, Ri is 120 REs or 10 OFDM symbols; for punctured PRB, Ri is variable, i.e., as the above the, Ri will vary according to the different influences leading to punctured PRB.

In one embodiment of the present invention, for the sake of simplification, the resource with the minimum resource granularity may be determined in PRB resources having various granularities, and the number of total resource may be converted according to the instance of minimum PRB. For example, the number of total resource can be obtained according to the formula $R_{min} \times N_{PRB}$, wherein $R_{min}$ is the resource granularity of PRB having the minimum granularity, $N_{PRB}$ is the number of the total PRB pairs. Although the preciseness is sacrificed in this way, the calculation is simplified greatly. It can be seen from the above description that the number of total resource can be calculated with various means without departing from the concept of the present invention, and other similar methods should also fall in the scope of protection of the present invention.

S805 The UE calculates the number of normal PRB pairs after conversion according to the number of total resource, and determines the TBS of downlink data based on the calculated number of normal PRB pairs after conversion and the TBS sequence number based on the MCS sequence number. In particular, in one embodiment of the present invention, if the number of total resource is $$\sum_i R_i \times N_i,$$

then the number of normal PRB pairs after conversion may be $$N'_{PRB} = \left\lfloor \frac{\sum_i R_i \times N_i}{R_0} \right\rfloor,$$

wherein $R_0$ is the resource number of general PRB pairs, and the corresponding LTE system can be considered to have 12 OFDM symbols or 120 REs, $N'_{PRB}$ is the number of normal PRB pairs after conversion, $\lfloor x \rfloor$ means performing a rounding-down operation to x. Then the TBS of downlink data is determined by looking up MCS table based on the number of normal PRB pairs after conversion. In one embodiment of the present invention, in order to avoid the value of $N'_{PRB}$ i to be 0, the number of normal PRB pairs after conversion may also be $$N'_{PRB} = \max\left\{1, \left\lfloor \frac{\sum_i R_i \times N_i}{R_0} \right\rfloor\right\}.$$

In the simplification processing in the above embodiment, the number of normal PRB pairs after conversion may also be $$N'_{PRB} = \max\left\{1, \left\lfloor \frac{N_{min} \times N_{PRB}}{R_0} \right\rfloor\right\},$$

wherein $R_{min}$ is the resource quantity of PRB having the minimum granularity, $N_{PRB}$ is the number of the total PRB pairs, $N'_{PRB}$ is the number of normal PRB pairs after conversion, $\lfloor x \rfloor$ means performing a rounding-down operation to x.

Of course in the embodiments of the present invention, the number of normal PRB pairs after conversion may also be calculated with other means, e.g., with the formula $Np+N'_{PRB}$, wherein Np is the number of normal PRB pairs (i.e., $N_{PRB1}$ in the above embodiment), $$N'_{PRB} = \max\left\{1, \left\lfloor \frac{\sum_i R_i \times N_i}{R_0} \right\rfloor\right\},$$

Ri is the resource granularity of punctured PRB, and Ni is the number of punctured PRB.

Certainly, the above examples on how to calculate the number of normal PRB pairs after conversion are only embodiments of the present invention, and a person skilled in the art could perform equivalent calculations according to the above embodiments of the present invention. These equivalent calculations based on the identical inventive concept should be covered by the scope of protection of the present invention.

Figure 9:
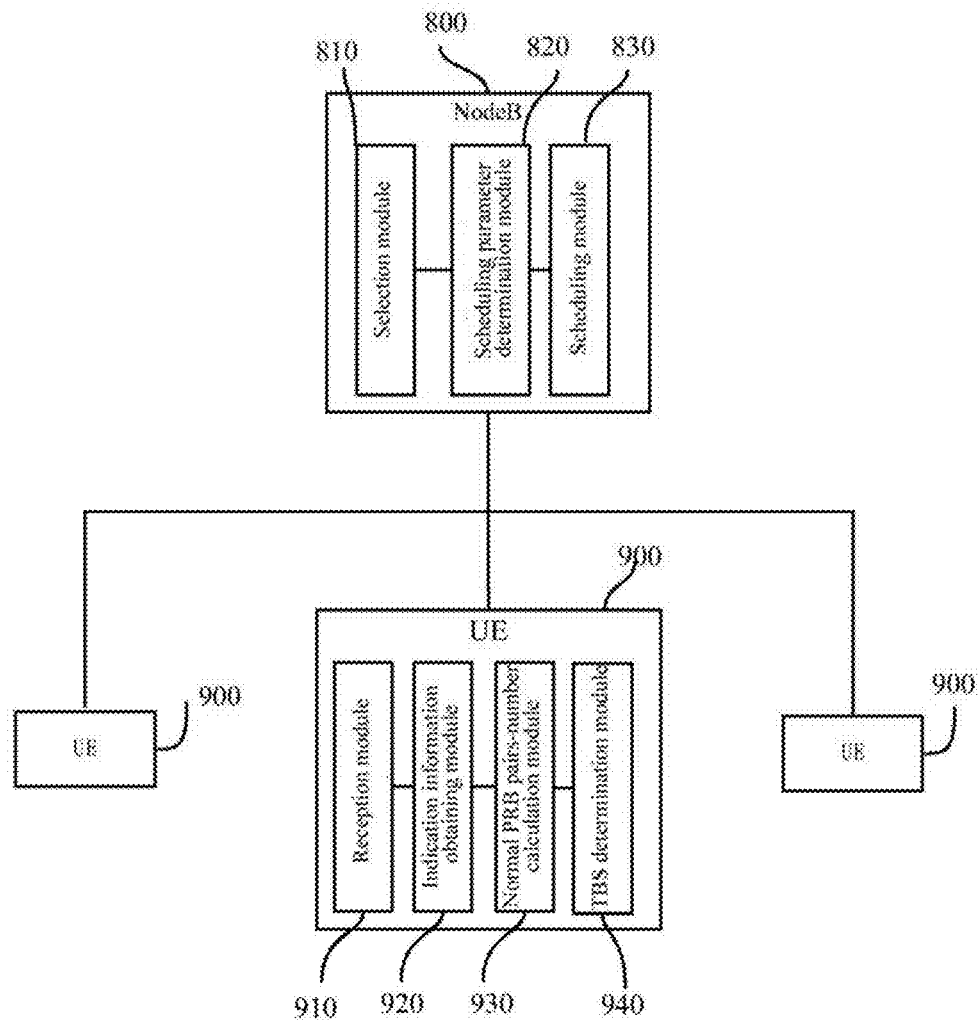
FIG. 9 is a structural view of an adaptive modulation and coding system according to the embodiment 2 of the present invention.

FIG. 9 is a structural view of an adaptive modulation and coding system according to one embodiment of the present invention. The system includes a NodeB 800 and at least one UE 900 being served by this NodeB 800. The NodeB 800 selects normal PRB and punctured PRB to transmit the downlink data for the UE 900, and determines the TBS and the number of total PRB pairs for transmission to the UE 900 based on the carried service, in which the number of total PRB pairs is the summation of the number of the scheduled normal PRB pairs and the number of the scheduled punctured PRB pairs, and schedules the downlink data for the UE 900 based on the determined TBS, and transmits the number of the total used PRB pairs and a MCS sequence number to the UE 900. The UE 900 is used for calculating the number of total resource based on the number of the total PRB pairs and situation of respective punctured PRBs, and calculating the number normal PRB pairs after conversion based on the total resource quantity, and determining the TBS of the downlink data based on the calculated number of the normal PRB pairs after conversion and the TBS sequence number determined by the MCS sequence number.

Wherein, the NodeB 800 comprises a selection module 810, a scheduling parameter determination module 820, and a scheduling module 830. The selection module 810 is used for selecting punctured PRB and normal PRB for the UE 900 to transmit the downlink data. The scheduling parameter determination module 820 is used for determining the Transport Block Size TBS and the number of the total PRB pairs for transmission to the UE 900 based on the carried service. The number of the total PRB pairs is the summation of the number of the scheduled normal PRB pairs and the number of the scheduled punctured PRB pairs. The scheduling module 830 is used for scheduling to transmit the downlink data for the UE 900 based on the determined TBS, and then transmitting the number of the total used PRB pairs and the MCS sequence number to the UE 900.

If the service carried by the NodeB 800 is VoIP service, the scheduling parameter determination module 820 determines the TBS based on the VoIP service, and determines the number of normal PRB pairs based on the determined TBS and channel quality information, and selects normal PRB and punctured PRB for the UE 900 to transmit the downlink data according to the schedulable resource, and calculates the number of punctured PRB pairs as well as the number of the total PRB pairs, wherein the number of punctured PRB pairs is obtained by converting the number of normal PRB pairs.

If the service carried by the NodeB 800 is data service, the scheduling parameter determination module 820 determines the number of scheduled normal PRB pairs and the number of punctured PRB pairs according to the schedulable resource, and calculates the number of the total PRB pairs as a summation of the number of normal PRB pairs and the number of punctured PRB pairs, and obtains the number of normal PRB pairs after conversion by converting the number of punctured PRB pairs. And TBS is obtained by looking up tables according to the number of normal PRB pairs and the number of normal PRB pairs after conversion.

In one embodiment of the present invention, the conversion relationship between the number of normal PRB pairs and the number of punctured PRB pairs is determined according to the size of punctured PRB.

In the above the embodiment, the UE 900 comprises a reception module 910, an indication information obtaining module 920, a normal PRB pair-number calculation module 930 and a TBS determination module 940. The reception module 910 is used for receiving the downlink data transmitted through the punctured and normal PRBs by the NodeB 800. The indication information obtaining module 920 is used for acquiring the MCS sequence number and the number of the total PRB pairs indicated by the scheduling signalling, wherein the number of the total PRB pairs is the summation of the number of the scheduled normal PRB pairs and the number of the punctured PRB pairs. The normal PRB pair-number calculation module 930 is used for calculating the total resource quantity based on the number of the total PRB pairs and the situation of respective punctured PRBs, and calculating the number of the normal PRB pairs after conversion based on the total resource quantity. The TBS determination module 940 is used for determining the TBS of the downlink data based on the calculated number of the normal PRB pairs after conversion and the TBS sequence number determined by the MCS sequence number.

In one embodiment of the present invention, the normal PRB pair-number calculation module 930 determines the number of total resource with the formula of $$\sum_i R_i \times N_i,$$

wherein Ri is resource granularity of each kind of PRB, Ni is the number of each kind of PRB. Then the number of normal PRB pairs after conversion may be calculated with the formula of $$N'_{PRB} = \left\lfloor \frac{\sum_i R_i \times N_i}{R_0} \right\rfloor \text{ or }$$

$$N'_{PRB} = \max\left\{1, \left\lfloor \frac{\sum_i R_i \times N_i}{R_0} \right\rfloor \right\},$$

wherein $N'_{PRB}$ is the number of normal PRB pairs after conversion, $\lfloor x \rfloor$ means performing a rounding-down operation to x.

In another embodiment of the present invention, the normal PRB pair-number calculation module 930 determines the number of total resource with the formula $R_{min} \times N_{PRB}$, wherein $R_{min}$ is the resource quantity of PRB having the minimum granularity, $N_{PRB}$ is the number of the total PRB pairs; then the number of normal PRB pairs after conversion is calculated with the formula $$N'_{PRB} = \max\left\{1, \left\lfloor \frac{R_{min} \times N_{PRB}}{R_0} \right\rfloor \right\},$$

wherein $R_{min}$ is the resource quantity of PRB having the minimum granularity, $N_{PRB}$ is the number of the total PRB pairs.

In another embodiment of the present invention, the normal PRB pair-number calculation module 930 determines the number of normal PRB pairs after conversion with the formula $Np+N'_{PRB}$, wherein Np is the number of normal PRB pairs, $$N'_{PRB} = \max\left\{1, \left\lfloor \frac{\sum_i R_i \times N_i}{R_0} \right\rfloor \right\},$$

Ri is the resource granularity of punctured PRB, and Ni is the number of punctured PRB.

The specific condition when downlink data are transmitted completely for partly with punctured PRBs may be performed in the present invention on the basis of utilizing the existing resources and adaptive processing of the general subframes by performing the present invention, which may be implemented simply and efficiently.

Although the embodiments of the present invention have been shown and described in the above, a person skilled in the art could subject these embodiments to various variations, modifications, substitutions and transformations without departing from the principle and spirit of the present invention, and the scope of protection of the present invention is defined by the appended claims and equivalents thereof.

The invention claimed is:

1. An adaptive modulation and coding method, comprising:
    selecting by a base station NodeB, special subframes for transmitting downlink data to user equipment UE, Physical Resource Blocks PRBs in the special subframes being punctured PRBs;
    scheduling and transmitting by the NodeB;
    scheduling the downlink data based on a determined Transport Block Size TBS;
    transmitting a first number representing quantity of the used punctured PRB pairs, and a Modulation and Coding Scheme MCS sequence number to the UE;
    converting by the UE the first number of the punctured PRB pairs to a second number representing quantity of normal PRB pairs;
    determining by the UE, a modulation scheme and a TBS sequence number based on the MCS sequence number; and
    determining by the UE, the TBS of the downlink data based on the second number of the normal PRB pairs and the TBS sequence number.

2. The adaptive modulation and coding method of claim 1, wherein the NodeB determines the TBS and the first number of punctured PRB pairs for transmission to the UE based on a carried service.

3. The adaptive modulation and coding method as in claim 1, wherein when a service carried by the NodeB is VoIP service, determining the Transport Block Size TBS and the first number of punctured PRB pairs for transmission to the UE further comprises:
    determining by the NodeB, the TBS based on the carried service;
    determining by the NodeB, the second number of the normal PRB pairs based on the determined TBS and channel quality information; and
    obtaining by the NodeB, the first number of the punctured PRB pairs by converting the second number of the normal PRB pairs.

4. The adaptive modulation and coding method as in claim 1, wherein when a service carried by the NodeB is a data service, determining the Transport Block Size TBS and the first number of punctured PRB pairs for transmission to the UE further comprises:
    determining by the NodeB, the first number of the punctured PRB pairs based on a schedulable resource;
    determining by the NodeB, obtains the second number of the normal PRB pairs by converting the first number of the punctured PRB pairs; and
    obtaining by the NodeB, the TBS by looking up tables according to the second number of the normal PRB pairs.

5. The adaptive modulation and coding method as in claim 1, wherein the converting relationship between the second number of the normal PRB pairs and the first number of the punctured PRB pairs is determined based on a size of the punctured PRB.

6. The adaptive modulation and coding method as in claim 5, wherein the converting relationship between the second number of the normal PRB pairs and the first number of the punctured PRB pairs is determined based on the size of the punctured PRB, that is:

based on a spectrum efficiency formula of $$\frac{TBS}{N_{P-PRB} \times N_{RE,P-PRB}} \approx \frac{TBS}{N_{PRB} \times N_{RE,PRB}} \text{ or }$$

$$\frac{TBS}{N_{P-PRB} \times N_{symbol,P-PRB}} \approx \frac{TBS}{N_{PRB} \times N_{symbol,PRB}},$$

wherein the TBS is the Transport Block Size; $N_{P-PRB}$ is the first number of the punctured PRB pairs for carrying the TBS, $N_{symbol,P-PRB}$ is second number of the normal PRB pairs for carrying the TBS; $N_{symbol,P-PRB}$ is a third number representing quantity of Orthogonal Frequency Division Multiplexing OFDM symbols in each pair of the punctured PRB for carrying the TBS, $N_{symbol,PRB}$ is a fourth number representing quantity of Orthogonal Frequency Division Multiplexing OFDM symbols in each pair of the normal PRB for carrying the TBS; $N_{RE,P-PRB}$ is a fifth number representing quantity of minimum REs determined by a time domain OFDM symbol and a frequency domain subcarrier occupied by the punctured PRB, $N_{RE,PRB}$ is a sixth number representing quantity of REs occupied by the normal PRB.

7. The adaptive modulation and coding method as in claim 6, wherein the converting relationship between the second number of the normal PRB pairs and the first number of the punctured PRB pairs is determined based on the formula of $$\frac{N_{PRB}}{N_{P-PRB}} \approx \frac{N_{RE,P-PRB}}{N_{RE,PRB}} \approx \frac{N_{symbol,P-PRB}}{N_{symbol,PRB}}.$$

8. The adaptive modulation and coding method as in claim 5, wherein the converting relationship between the second number of the normal PRB pairs and the first number of the punctured PRB pairs is determined based on a formula of $$N_{PRB} = \left\lfloor \frac{N_{P-PRB} N_{symbol,P-PRB}}{N_{symbol,PRB}} \right\rfloor,$$

wherein $N_{P-PRB}$ is the first number of the punctured PRB pairs for carrying the TBS; $N_{PRB}$ is the second number of the normal PRB pairs for carrying the TBS; $N_{symbol,P-PRB}$ is the third number of Orthogonal Frequency Division Multiplexing OFDM symbols in each pair of the punctured PRB for carrying the TBS; and $$\left\lfloor \frac{N_{P-PRB} N_{symbol,P-PRB}}{N_{symbol,PRB}} \right\rfloor$$

is an INT operation for values calculated based on $$\frac{N_{P-PRB} N_{symbol,P-PRB}}{N_{symbol,PRB}}.$$

9. The adaptive modulation and coding method as in claim 7, wherein the $N_{symbol,P-PRB}$ or $N_{RE,P-PRB}$ is obtained by looking up the following table according to the quantity of OFDM symbols available for the punctured PRB pairs:

| Type | Quantity of OFDM symbols available for the punctured PRB pairs | | $N_{symbol,}P\_PRB$ | $NRE\_P\_PRB$ |
| --- | --- | --- | --- | --- |
| | normal CP | extended CP | | |
| 1 | 13 | 11 | 9 | 108 |
| 2 | 12 | 10 | 8 | 96 |
| 3 | 11 | 9 | 7 | 84 |
| 4 | 10 | 8 | 6 | 72 |
| 5 | 9 | 7 | 5 | 60 |
| 6 | 8 | 6 | 4 | 48 |

10. The adaptive modulation and coding method as in claim 7, wherein the $N_{symbol,P-PRB}$ is determined based on the formula of $N_{symbol,P-PRB} = L_{symbol,P-PRB} - k$, wherein $L_{symbol,P-PRB}$ represents a seventh number representing quantity of OFDM symbols available for the punctured PRB pairs, k is a constant related to the length of the CP.

11. The adaptive modulation and coding method as in claim 10, wherein for the normal CP, k=4, and for the extended CP, k=2.

12. The adaptive modulation and coding method as in claim 7, wherein the $N_{symbol,P-PRB}$ is obtained as follows:
if the size of the punctured PRB pairs is smaller than a threshold value $k_0$, then it is defaulted that the third number of OFDM symbols of the punctured PRB pairs for carrying the TBS is a constant $k_1$, wherein $k_0$, $k_1$ are constants.

13. The adaptive modulation and coding method as in claim 1, wherein when a code word is mapped to an n-layer spatial multiplexing, n being a positive integer, the first number of the punctured PRB pairs and the second number of the normal PRB pairs are multiplied by n.

14. An adaptive modulation and coding method, comprising:
receiving by a UE, downlink data transmitted from a NodeB by special subframes;
obtaining a first number representing quality of punctured PRB pairs and a Modulation and Coding Scheme MCS sequence number indicated by a scheduling signalling;
converting the first number of the punctured PRB pairs to a second number representing quantity of normal PRB pairs;
determining a modulation scheme and a TBS sequence number based on the MCS sequence number, and
determining a TBS of the downlink data based on the second number of the normal PRB pairs and the TBS sequence number.

15. The adaptive modulation and coding method as in claim 14, wherein the converting relationship between the second number of the normal PRB pairs and the first number of the punctured PRB pairs is determined based on a size of the punctured PRB.

16. The adaptive modulation and coding method as in claim 15, wherein the converting relationship between the second number of the normal PRB pairs and the first number of the punctured PRB pairs is determined based on the size of the punctured PRB, that is:
based on a spectrum efficiency formula of $$\frac{TBS}{N_{P-PRB} \times N_{RE,P-PRB}} \approx \frac{TBS}{N_{PRB} \times N_{RE,PRB}} \text{ or}$$
$$\frac{TBS}{N_{P-PRB} \times N_{symbol,P-PRB}} \approx \frac{TBS}{N_{PRB} \times N_{symbol,PRB}},$$

wherein the TBS is the Transport Block Size; $N_{P-PRB}$ is the first number of the punctured PRB pairs for carrying the TBS, $N_{PRB}$ is the second number of the normal PRB pairs for carrying the TBS; $N_{symbol,P-PRB}$ is a third number representing quantity of Orthogonal Frequency Division Multiplexing OFDM symbols in each pair of the punctured PRB for carrying the TBS, $N_{symbol,PRB}$ is a fourth number representing quantity of Orthogonal Frequency Division Multiplexing OFDM symbols in each pair of the normal PRB for carrying the TBS; $N_{RE,P-PRB}$ is a fifth number representing quantity of minimum REs determined by a time domain OFDM symbol and a frequency domain subcarrier occupied by the punctured PRB, $N_{RE,PRB}$ is a sixth number representing quantity of REs occupied by the normal PRB.

17. The adaptive modulation and coding method as in claim 15, wherein the conversion relationship between the second number of the normal PRB pairs and the first number of the punctured PRB pairs is determined based on a formula of $$N_{PRB} = \left\lfloor \frac{N_{P-PRB} N_{symbol,P-PRB}}{N_{symbol,PRB}} \right\rfloor,$$

wherein $N_{P-PRB}$ is the first number of the punctured PRB pairs for carrying the TBS; $N_{PRB}$ is the second number of the normal PRB pairs for carrying the TBS; $N_{symbol,P-PRB}$ is the third number of Orthogonal Frequency Division Multiplexing OFDM symbols in each pair of the punctured PRB for carrying the TBS; and $$\left\lfloor \frac{N_{P-PRB} N_{symbol,P-PRB}}{N_{symbol,PRB}} \right\rfloor$$

is an INT operation for values calculated based on $$\frac{N_{P-PRB} N_{symbol,P-PRB}}{N_{symbol,PRB}}.$$

18. The adaptive modulation and coding method as in claim 16, wherein the $N_{symbol,P-PRB}$ is obtained as follows:
if the size of the punctured PRB pairs is smaller than a threshold value $k_0$, then it is defaulted that the third number of OFDM symbols of the punctured PRB pairs for carrying the TBS is a constant $k_1$, wherein $k_0$, $k_1$ are constants.

19. The adaptive modulation and coding method as in claim 14, wherein when a code word is mapped to an n-layer spatial multiplexing, n being a positive integer, the first number of the punctured PRB pairs and the second number of the normal PRB pairs are multiplied by n.

20. A UE comprising:
a reception module;
an indication information obtaining module;
a conversion module;
a TBS determination module, wherein the reception module is used for receiving the downlink data transmitted through special subframes from a NodeB, the indication information obtaining module is used for obtaining a first number representing quantity of the punctured PRB pairs and a MCS sequence number indicated by a scheduling signaling, the conversion module is used for converting the first number of the punctured PRB pairs to a second number representing quantity of normal PRB pairs, and the TBS determination module is used for determining a modulation scheme and a TBS sequence number based on the MCS sequence number, and determining a TBS of the downlink data based on the second number of the normal PRB pairs converted by the conversion module and the TBS sequence number.

21. The UE as in claim 20, wherein the TBS determination module includes a table saving submodule and a looking-up-table submodule, wherein
the table saving submodule is used for saving the modulation scheme corresponding to the MCS sequence number and a list of the TBS sequence number as well as TBS tables, and
the looking-up-table submodule is used for determining the modulation scheme and the TBS sequence number according to the MCS sequence number obtained by the indication information obtaining module, and then determining the TBS of the downlink data of the MCS based on the second number of the normal PRB pairs converted by the conversion module and the TBS sequence number.

22. The UE as in claim 21, wherein the conversion relationship between the second number of the normal PRB pairs and the first number of the punctured PRB pairs is determined by the conversion module
based on a formula of $$N_{PRB} = \left\lfloor \frac{N_{P-PRB} N_{symbol,P-PRB}}{N_{symbol,PRB}} \right\rfloor,$$

wherein $N_{P-PRB}$ is the first number of the punctured PRB pairs for carrying the TBS; $N_{PRB}$ is the second number of the normal PRB pairs for carrying the TBS; $N_{symbol,P-PRB}$ is a third number representing quantity of Orthogonal Frequency Division Multiplexing OFDM symbols in each pair of the punctured PRB for carrying the TBS; and $$\left\lfloor \frac{N_{P-PRB} N_{symbol,P-PRB}}{N_{symbol,PRB}} \right\rfloor$$

is an INT operation for values calculated based on $$\frac{N_{P-PRB} N_{symbol,P-PRB}}{N_{symbol,PRB}}.$$

* * * * *